United States Patent
Bretthauer

(10) Patent No.: US 7,529,040 B2
(45) Date of Patent: *May 5, 2009

(54) PROJECTION OBJECTIVE WITH FIXED FOCAL LENGTH FOR DIGITAL PROJECTION

(75) Inventor: Bernard Bretthauer, Göttingen (DE)

(73) Assignee: Jos. Schneider Optische Werke GmbH (DE)

( * ) Notice: Subject to any disclaimer, the term of this patent is extended or adjusted under 35 U.S.C. 154(b) by 21 days.

This patent is subject to a terminal disclaimer.

(21) Appl. No.: 11/820,854

(22) Filed: Jun. 21, 2007

(65) Prior Publication Data

US 2008/0013192 A1    Jan. 17, 2008

(30) Foreign Application Priority Data

Jun. 22, 2006   (EP)   .................. 06012841

(51) Int. Cl.
*G02B 13/04* (2006.01)

(52) U.S. Cl. ...................... 359/750; 359/749
(58) Field of Classification Search .............. 359/740, 359/749, 750, 754
See application file for complete search history.

(56) References Cited

U.S. PATENT DOCUMENTS

| | | | |
|---|---|---|---|
| 3,036,499 A | 5/1962 | Lautenbacher | |
| 4,070,098 A | 1/1978 | Buchroeder | |
| 6,542,316 B2 * | 4/2003 | Yoneyama | 359/749 |
| 6,624,952 B2 * | 9/2003 | Kuwa et al. | 359/726 |
| 6,801,373 B2 * | 10/2004 | Reinecke et al. | 359/754 |
| 6,989,946 B2 * | 1/2006 | Kobayashi et al. | 359/754 |
| 7,280,285 B2 * | 10/2007 | Nagahara et al. | 359/680 |
| 2003/0137744 A1 | 7/2003 | Kuwa et al. | |
| 2008/0013193 A1 * | 1/2008 | Bretthauer et al. | 359/754 |

FOREIGN PATENT DOCUMENTS

| | | |
|---|---|---|
| DE | 2 306 346 | 8/1974 |
| DE | 103 53 563 A1 | 6/2005 |
| EP | 1 215 519 A1 | 6/2002 |

\* cited by examiner

*Primary Examiner*—David N Spector
(74) *Attorney, Agent, or Firm*—Price, Heneveld, Cooper, DeWitt & Litton, LLP

(57) ABSTRACT

A projection objective having a fixed focal length for digital projection includes the following arrangement of the lenses in the sequence from the image (enlargement side) to the object (reduction and illumination side):
  a first, negative lens,
  a second, negative lens,
  a third lens,
  a fourth, positive lens,
  a fifth lens,
  a sixth, positive lens,
  a seventh, negative lens,
  an eighth, positive lens, and
  a ninth, positive lens.

By means of such an objective, the quality requirements in the field of digital projection can be met with a minimal number of lenses.

19 Claims, 8 Drawing Sheets

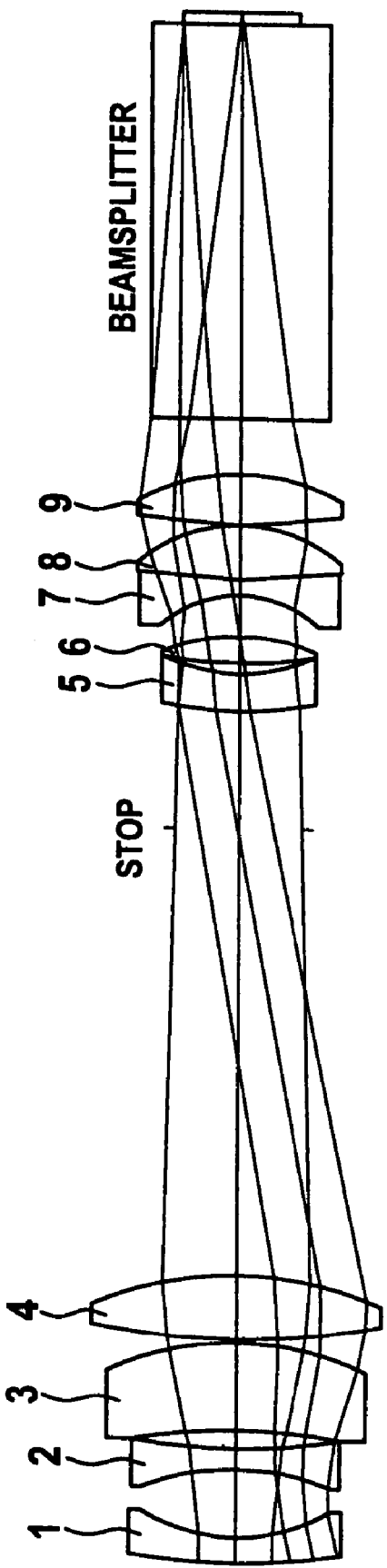

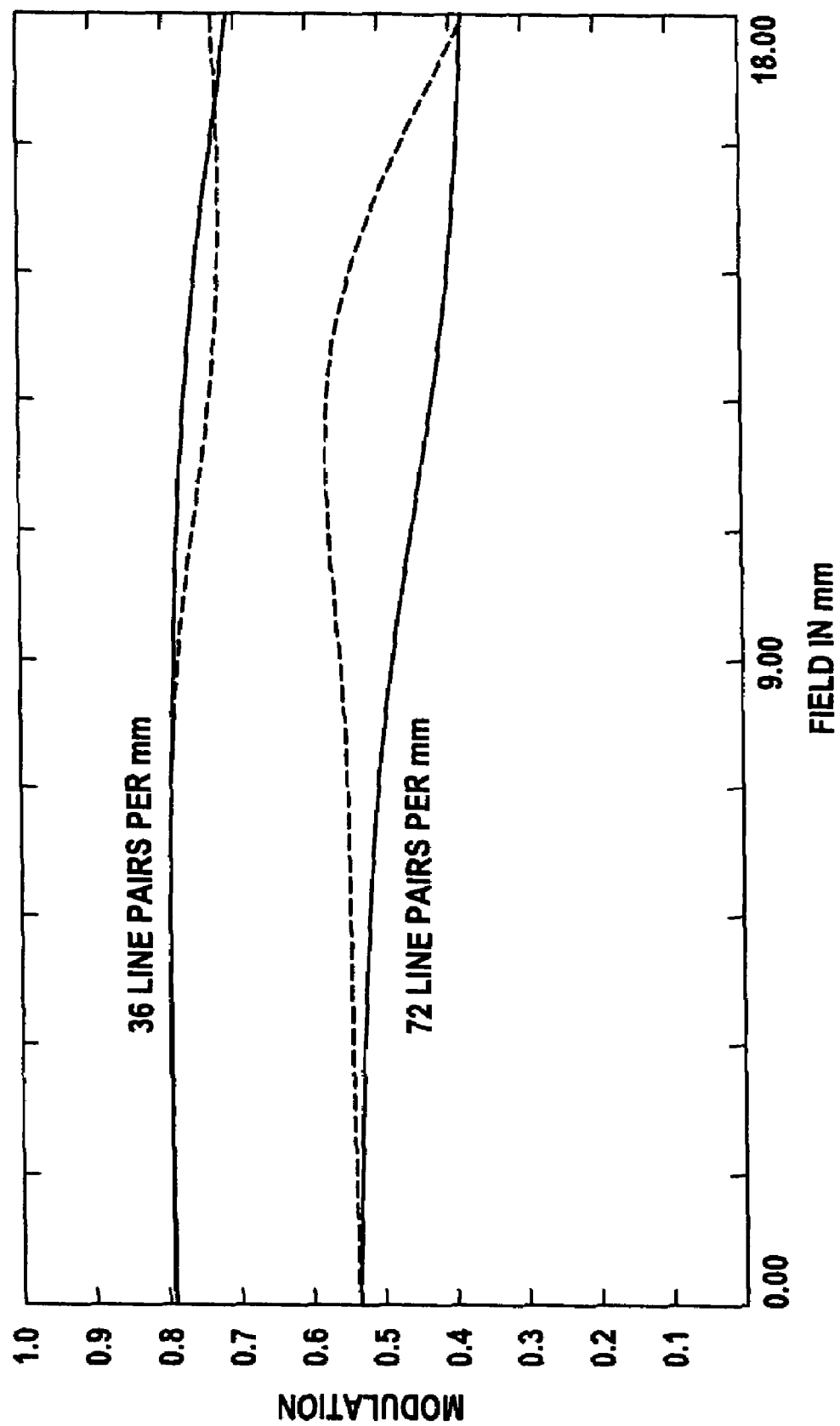

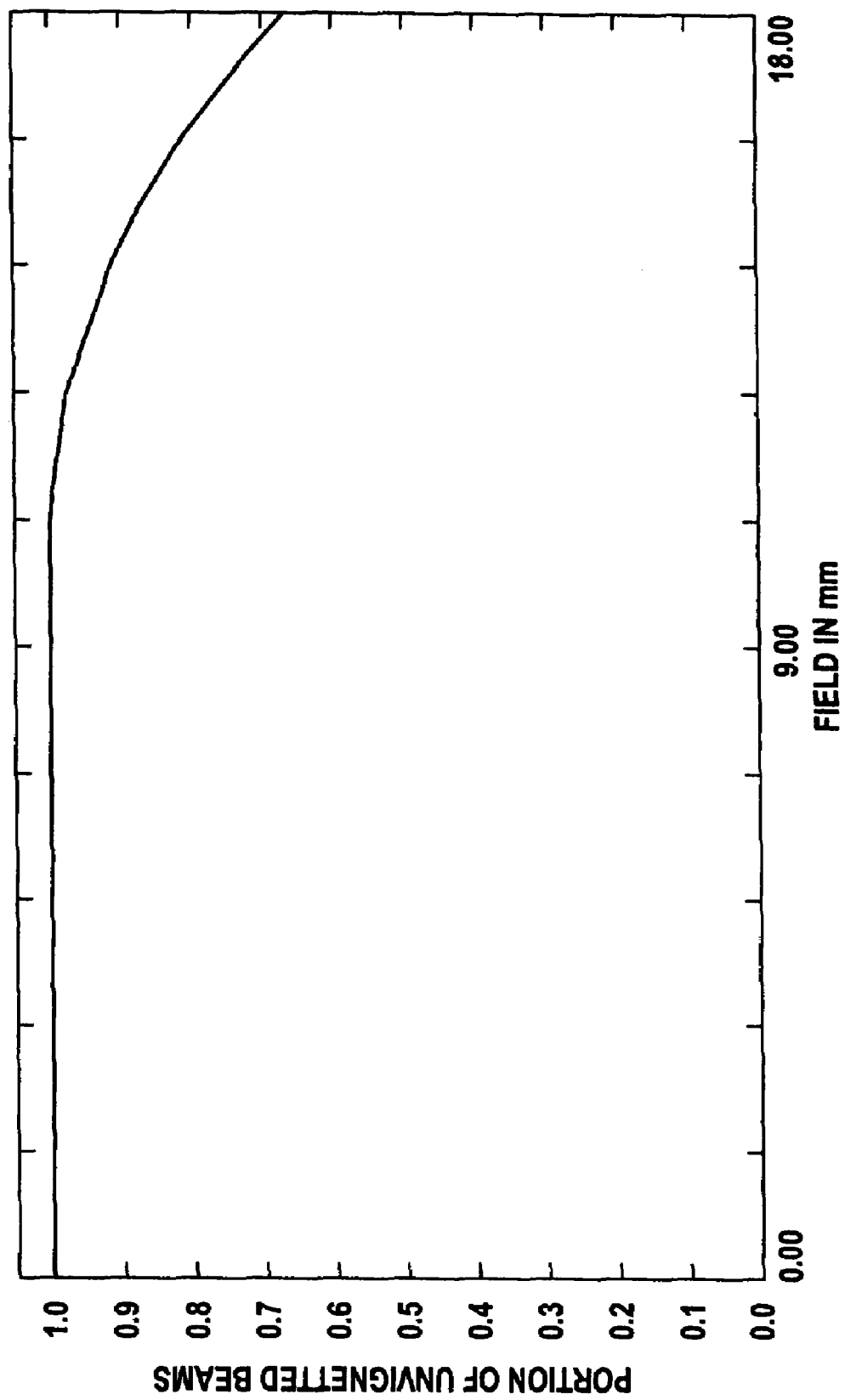

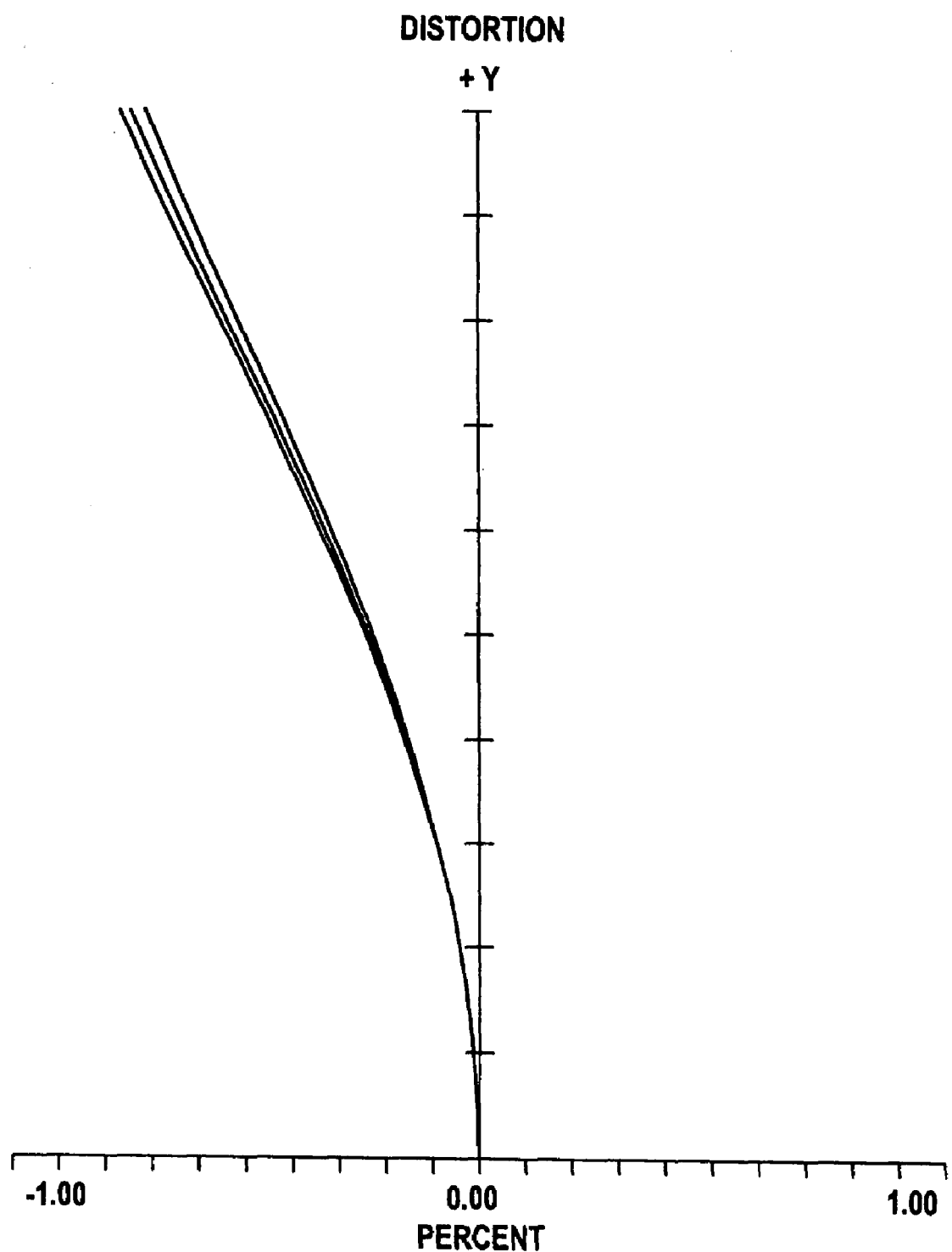
ILLUSTRATION 4

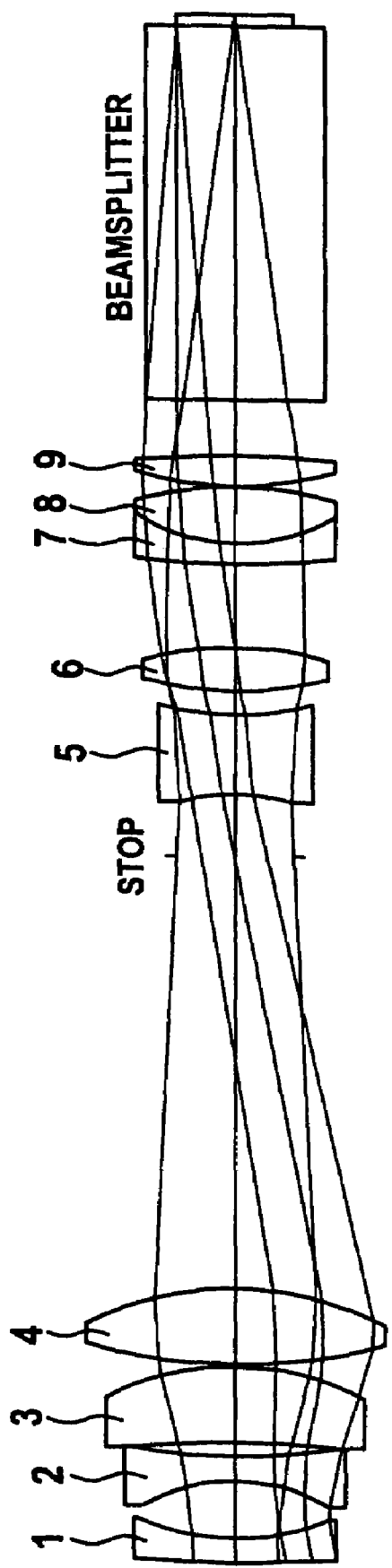

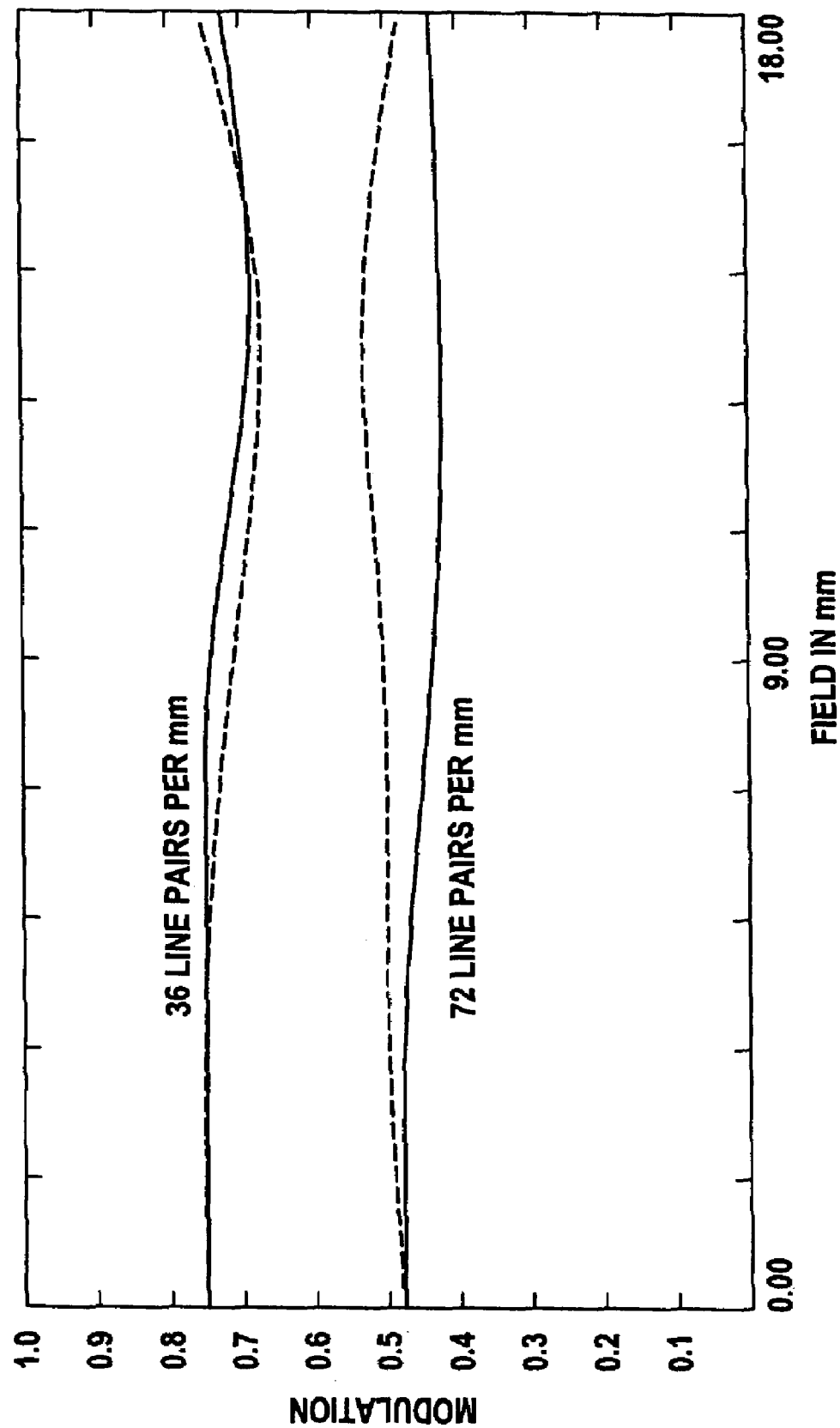

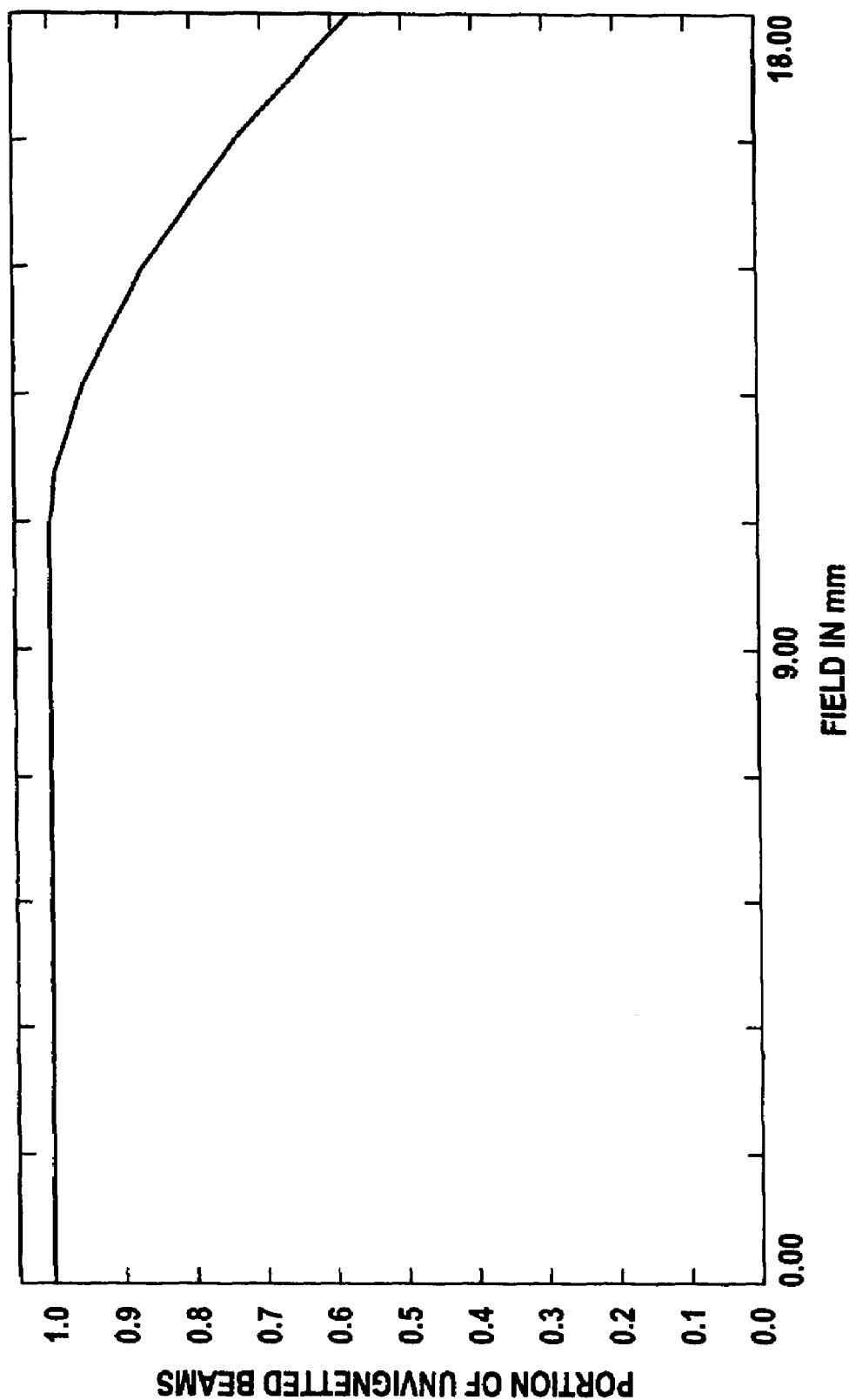

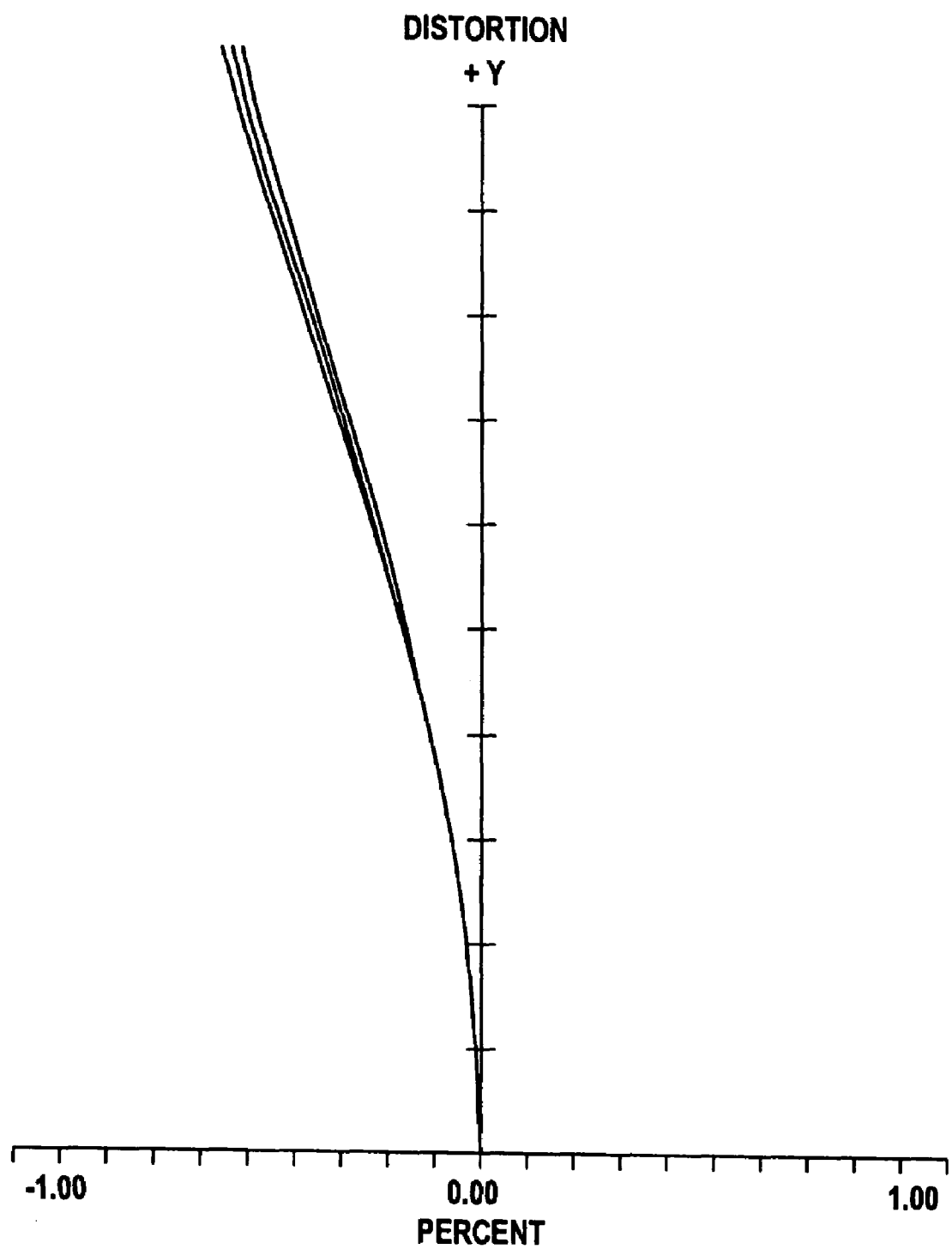
ILLUSTRATION 8

PROJECTION OBJECTIVE WITH FIXED FOCAL LENGTH FOR DIGITAL PROJECTION

CLAIM OF PRIORITY

Applicant hereby claims the priority benefits under the provisions of 35 U.S.C. § 119, basing said claim of priority on European Patent Application Serial No. 06 012 841.0, filed Jun. 22, 2006. In accordance with the provisions of 35 U.S.C. § 119 and Rule 55(b), a certified copy of the above-listed European patent application will be filed before grant of a patent.

BACKGROUND OF THE INVENTION

The field of application of the invention is digital projection, in particular for digital cinema. The projection objective finds application, for example, as a base objective with an anamorphic attachment.

Projectors used in digital cinema are distinguished through a beam-splitting prism between the chips and the objective. The glass path is up to 119.5 mm, which causes a longitudinal chromatic aberration, as well as a spherical aberration. These aberrations must be corrected by the projector objective. Thus, objectives calculated for other circumstances are fundamentally unsuitable.

Mainly, zoom objectives are offered on the market. However, for fixed installations, a zoom objective is not necessary. Moreover, the conversion of the chip format to the image format 2.35:1 advantageously takes place in digital cinema with the aid of an anamorphic attachment. In order to reduce the dimensions of the attachment and thus the costs, it is necessary that the screen side pupil not be too far away from the front lens. This goal is difficult to achieve with zoom objectives.

Described in DE 103 53 563 B4 is an objective with fixed focal length that meets the requirements. However, in all of the specified embodiment forms, this objective contains an aspherical surface, which increases the production costs.

SUMMARY OF THE INVENTION

The goal is an objective with fixed focal length that meets the quality requirements in the field of digital projection, in particular digital cinema, with a minimum number of lenses. The distance from the screen side pupil to the front lens is to be dimensioned in such a way that a clear reduction of the mass of the required anamorphic attachment results.

Although the requirement for imaging quality makes the use of special glasses with an abbe number value of $v_d > 75$ appear indispensable, nevertheless the use of these glasses is to be limited to as few lenses as possible, since they involve high costs both in their acquisition and their processing. Particularly high costs are involved in the use of lenses consisting of calcium fluoride or the use of glasses with a value $v_d > 85$, which should be avoided. Likewise to be avoided are aspheric surfaces, since the number of lenses is to be kept as small as possible.

The above-stated goal of the invention is achieved through a projection objective according to the features set forth herein in claim 1, thus through a projection objective of fixed focal length for digital projection with the following arrangement of the lenses in the sequence from the enlargement side to the reduction side:

a first, negative lens,
a second, negative lens,
a third lens,
a fourth, positive lens,
a fifth lens,
a sixth, positive lens,
a seventh, negative lens,
an eighth, positive lens, and
a ninth, positive lens.

According to a particular embodiment of the invention according to claim 2 herein, the projection objective is formed with the following arrangement of the lenses in the sequence from the enlargement side to the reduction and illumination side:

a first, negative lens with a convex surface on the enlargement side and a concave surface on the reduction side,
a second, biconcave lens,
a third lens with a concave surface on the enlargement side and a convex surface on the reduction side,
a fourth, biconvex lens,
a fifth lens with a concave surface toward the reduction side,
a sixth, biconvex lens,
a seventh lens with a concave surface toward the reduction side,
an eighth, biconvex lens, and
a ninth, biconvex lens.

In particular, it is planned that the fifth lens will have a convex or concave surface toward the enlargement side and/or the seventh lens will have a concave or convex surface toward the enlargement side.

In addition, between the fourth and fifth lenses a stop is advantageously arranged.

With regard to the relationships of the values of the index of refraction $n_d$ and the abbe number $v_d$, the following value ranges are preferably fulfilled:

| Lens No. | $n_d$ | $v_d$ |
|---|---|---|
| 1 | Greater than 1.6 | Less than 62 |
| 2 | Between 1.58 and 1.8 | Less than 62 |
| 3 | Greater than 1.65 | Less than 41 |
| 4 | Between 1.6 and 1.8 | Between 45 and 62 |
| 5 | Greater than 1.64 | Between 30 and 45 |
| 6 | Less than 1.74 | Greater than 44 |
| 7 | Less than 1.75 | Between 40 and 66 |
| 8 | Less than 1.50 | Greater than 70 |
| 9 | Less than 1.50 | Greater than 70 |

In particular, the following value ranges for these parameters result:

| Lens No. | $n_d$ | $v_d$ |
|---|---|---|
| 1 | Greater than 1.7 | Less than 50 |
| 2 | Between 1.56 and 1.8 | Less than 62 |
| 3 | Greater than 1.65 | Less than 35 |
| 4 | Between 1.6 and 1.8 | Between 45 and 60 |
| 5 | Greater than 1.65 | Between 30 and 45 |
| 6 | Less than 1.7 | Greater than 45 |
| 7 | Less than 1.75 | Between 40 and 61 |
| 8 | Less than 1.50 | Greater than 70 |
| 9 | Less than 1.50 | Greater than 70 |

It is considered to be especially advantageous when the abbe number Vd is greater than 85 for all of the lenses.

The seventh and the eighth lenses are preferably cemented together.

In the objective according to the invention, the correction, as well as the back focal length of the objective, preferably allow a beam splitter between the objective and the object to be projected. This beam splitter possesses a glass path of 80 mm to 130 mm, preferably 110 mm to 130 mm, in particular 115 mm to 125 mm.

The invention makes possible an object side aperture diaphragm that is very far away from the object. The objective side aperture diaphragm is at least 800 mm, preferably at least 1200 mm, in particular at least 2000 mm away from the object.

It is considered to be especially advantageous, especially for cost reasons, when all of the lens surfaces of the lenses of the projection objective are spherical or planar.

Further features of the invention are represented in the dependent claims and the explanation of the embodiment examples, in connection with which it is remarked that all individual features and combinations of individual features are essential to the invention.

These and other advantages of the invention will be further understood and appreciated by those skilled in the art by reference to the following written specification, claims and appended drawings.

BRIEF DESCRIPTION OF THE DRAWINGS

Illustration 1 is a partially schematic side view of a lens section embodying the present invention.

Illustration 2 is a graph of the modulation transfer function for the lens illustrated in FIG. 1.

Illustration 3 is a graph of the vignetting for the lens shown in FIG. 1.

Illustration 4 is a graph of the distortion of the objective for the lens shown in FIG. 1.

Illustration 5 is a partially schematic side elevational view of another embodiment of the present invention.

Illustration 6 is a graph of the modular transfer function for the lens embodiment shown in FIG. 5.

Illustration 7 is a graph of the vignetting for the lens embodiment shown in FIG. 5.

Illustration 8 is a graph of the distortion of the objective for the lens embodiment shown in FIG. 5.

DETAILED DESCRIPTION OF THE PREFERRED EMBODIMENTS

For purposes of description herein, the terms "upper", "lower", "right", "left", "rear", "front", "vertical", "horizontal" and derivatives thereof shall relate to the invention as oriented in Illustrations 1 and 5. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The invention is represented through two embodiment forms, without being limited to these examples.

Illustration 1 shows a lens section of an exemplary embodiment of the present invention. The precise optical data of this projection objective are given in claim 12 herein, the projection objective according to this embodiment form being constituted as follows: Data for lenses 1 to 9:

| Notation | Surface | Radius [mm] | Thickness [mm] | $n_d$ | $v_d$ |
|---|---|---|---|---|---|
| Lens 1 | 1 | 215.573 | 7.400 | 1.8052 | 25.4 |
|  | 2 | 60.054 | 19.873 |  |  |
| Lens 2 | 3 | −86.116 | 6.198 | 1.7292 | 54.5 |
|  | 4 | 214.588 | 5.812 |  |  |
| Lens 3 | 5 | −159.767 | 25.000 | 1.7174 | 29.5 |
|  | 6 | −97.046 | 1.422 |  |  |
| Lens 4 | 7 | 233.759 | 19.000 | 1.7292 | 54.5 |
|  | 8 | −110.662 | 133.385 |  |  |
| Stop | 9 | planar | 34.694 |  |  |
| Lens 5 | 10 | 119.584 | 11.300 | 1.8061 | 40.6 |
|  | 11 | 52.245 | 3.364 |  |  |
| Lens 6 | 12 | 192.641 | 7.500 | 1.5168 | 64.2 |
|  | 13 | −65.831 | 12.288 |  |  |
| Lens 7 | 14 | −37.013 | 5.000 | 1.5827 | 46.6 |
| Lens 8 | 15 | 293.564 | 15.600 | 1.4970 | 81.6 |
|  | 16 | −48.182 | 0.200 |  |  |
| Lens 9 | 17 | 181.597 | 15.000 | 1.4970 | 81.6 |
|  | 18 | −65.785 | 17.000 |  |  |
| Beam Splitter | 19 | planar | 116.500 | 1.5168 | 64.2 |
| Protective Glass | 20 | planar | 3.000 | 1.5085 | 61.2 |
|  | 21 | planar | 0.507 |  |  |
| Object |  | planar |  |  |  |

For practical reasons, the objective is described in reversed position (illustrated from the enlargement side to the reduction side). A negative sign before the radius means that the center point of the lens surface lies on the enlargement side relative to the apex. The surfaces 1 to 18 describe the objective as claimed; the surfaces 19 to 22 represent the beam splitter, protective glass, and chip of the projector.

In the illustrated embodiment, the glass block with a total thickness of 119.5 mm represents a simplified optical model of the beam splitter in the projector. For practical reasons, the objective is described in reversed position (illustrated from the enlargement side to the reduction side). The focal length of the objective is 57 mm, and the relative aperture is 1:2.5. On the reduction side, a circle with a radius of 18 mm is usable, which on the enlargement side leads to a maximum projection angle of 2w=35.10. The distance of the pupil from the first lens apex on the enlargement side amounts to 77.4 mm. On the reduction side, the distance of the pupil is over 6 meters. This means that the objective is nearly telecentric on this side and thus optimally matched to the illumination system of the projector.

The objective requires only nine spherical lenses, with only the last two lenses consisting of glasses with an abbe number $v_d > 75$.

In the conventional digital projector, an individual picture element has a size of 13.68 μm. This corresponds to approximately 73 pixels per millimeter or approximately 36 line pairs per millimeter that the projector can at most represent. According to experience, a projection objective must be able to represent twice as many line pairs per millimeter as the associated digital projector in order for the objective to be perceived as high quality by the viewer. Thus, in the judgement of the objective, the modulation transfer function (MTF) of up to 72 line pairs per millimeter is to be considered. Illustration 2 shows this MTF. The MTF was calculated at the wavelengths of 460 nm, 545 nm, and 620 nm, wherein the middle wavelength was evaluated with the weight 2 and the other wavelengths with the weight 1. The MTF exhibits good contrast values at 36 line pairs per millimeter and at 72 line pairs per millimeter. The slight drop-off of the contrast from the center to the edge indicates a very good correction of the lateral chromatic aberration. The correction of this aberration is especially important in digital projection, since it leads to troublesome color edges.

Illustration 3 shows the vignetting, and Illustration 4 shows the distortion of this objective.

Illustration 5 shows a further embodiment example. The focal length of the objective was increased to 69 mm. The precise optical data of this projection objective are also given in claim 13 herein. The projection objective according to this embodiment form is constituted as follows:

Data for lenses 1 to 9:

| Notation | Surface | Radius [mm] | Thickness [mm] | $n_d$ | $v_d$ |
|---|---|---|---|---|---|
| Lens 1 | 1 | 489.067 | 7.500 | 1.7440 | 44.9 |
|  | 2 | 76.083 | 17.565 |  |  |
| Lens 2 | 3 | −65.740 | 7.500 | 1.7552 | 27.6 |
|  | 4 | 166.123 | 4.232 |  |  |
| Lens 3 | 5 | −1167.668 | 24.000 | 1.7552 | 27.6 |
|  | 6 | −95.446 | 0.992 |  |  |
| Lens 4 | 7 | 191.825 | 23.000 | 1.6584 | 50.9 |
|  | 8 | −101.162 | 132.991 |  |  |
| Stop | 9 | planar | 19.359 |  |  |
| Lens 5 | 10 | −79.551 | 24.881 | 1.6727 | 32.3 |
|  | 11 | 92.129 | 7.145 |  |  |
| Lens 6 | 12 | 107.711 | 13.349 | 1.6584 | 50.9 |
|  | 13 | −108.508 | 25.694 |  |  |
| Lens 7 | 14 | 448.856 | 6.000 | 1.6204 | 60.3 |
| Lens 8 | 15 | 56.510 | 17.000 | 1.4970 | 81.6 |
|  | 16 | −133.601 | 0.200 |  |  |
| Lens 9 | 17 | 107.738 | 9.199 | 1.4970 | 81.6 |
|  | 18 | −409.370 | 17.000 |  |  |
| Beam Splitter | 19 | planar | 116.500 | 1.5168 | 64.2 |
| Protective Glass | 20 | planar | 3.000 | 1.5085 | 61.2 |
|  | 21 | planar | 0.522 |  |  |
| Object |  | planar |  |  |  |

For practical reasons, the objective is described in reversed position (illustrated from the enlargement side to the reduction side). A negative sign before the radius means that the center point of the lens surface lies on the enlargement side relative to the apex. The surfaces 1 to 18 describe the objective as claimed herein; the surfaces 19 to 22 represent the beam splitter, protective glass, and chip of the projector.

In the objective according to this illustrated embodiment, the relative aperture amounts to 1:2.5. On the reduction side, a circle with a radius of 18 mm is usable, which on the enlargement side leads to a maximum projection angle of 2w=29.2°. The distance of the pupil from the first lens apex on the enlargement side amounts to 90 mm. Through the reduced projection angle, the increase of the pupil distance relative to that of the first example is unproblematic with regard to the use of anamorphic attachments. On the reduction side, the distance of the pupil is over 5 meters. This means that the objective is nearly telecentric on this side, and this optimally is matched to the illumination system of the projector.

Illustration 6 shows the MTF, Illustration 7 shows the vignetting, and Illustration 8 shows the distortion of this objective.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A projection objective having a fixed focal length for digital projection including an arrangement of lenses, comprising in sequence from enlargement side to reduction side:
    a first, negative lens having a convex surface on the enlargement side and a concave surface on the reduction side;
    a second, negative biconcave lens;
    a third lens having a concave surface on the enlargement side and a convex surface on the reduction side;
    a fourth, positive biconvex lens;
    a fifth lens having a concave surface toward the reduction side;
    a sixth, positive biconvex lens;
    a seventh, negative lens having a concave surface toward the reduction side;
    an eighth, positive biconvex lens; and
    a ninth, positive biconvex lens.

2. A projection objective as set forth in claim 1, wherein:
    said fifth lens has a convex or concave surface toward the enlargement side; and
    said seventh lens has a concave or convex surface toward the enlargement side.

3. A projection objective as set forth in claim 2, including:
    a stop arranged between said fourth and said fifth lenses.

4. A projection objective as set forth in claim 3, having the following relationships for the values of index of refraction $n_d$ and abbe number $v_d$:

| Lens No. | $n_d$ | $v_d$ |
|---|---|---|
| 1 | Greater than 1.6 | Less than 62 |
| 2 | Between 1.58 and 1.8 | Less than 62 |
| 3 | Greater than 1.65 | Less than 41 |
| 4 | Between 1.6 and 1.8 | Between 45 and 62 |
| 5 | Greater than 1.64 | Between 30 and 45 |
| 6 | Less than 1.74 | Greater than 44 |
| 7 | Less than 1.75 | Between 40 and 66 |
| 8 | Less than 1.50 | Greater than 70 |
| 9 | Less than 1.50 | Greater than 70. |

5. A projection objective as set forth in claim 4, having the following relationships for the values of index of refraction $n_d$ and abbe number $v_d$:

| Lens No. | $n_d$ | $v_d$ |
|---|---|---|
| 1 | Greater than 1.7 | Less than 50 |
| 2 | Between 1.56 and 1.8 | Less than 62 |
| 3 | Greater than 1.65 | Less than 35 |
| 4 | Between 1.6 and 1.8 | Between 45 and 60 |
| 5 | Greater than 1.65 | Between 30 and 45 |
| 6 | Less than 1.7 | Greater than 45 |
| 7 | Less than 1.75 | Between 40 and 61 |
| 8 | Less than 1.50 | Greater than 70 |
| 9 | Less than 1.50 | Greater than 70. |

6. A projection objective as set forth in claim 5, wherein: the abbe number $v_d$ for each of said lenses is less than 85.

7. A projection objective as set forth in claim 6, wherein: said seventh and eighth lenses are cemented to each other.

8. A projection objective as set forth in claim 7, wherein: the optical correction and the back focal length of said projection objective permit a beam splitter between the objective and the object to be projected, which beam splitter has a glass path from 80 mm to 130 mm.

9. A projection objective as set forth in claim 8, including: a reduction side pupil disclosed at least 800 mm away from the objective.

10. A projection objective as set forth in claim 9, wherein: each of said lens surfaces is spherical or planar.

11. A projection objective as set forth in claim 10, having the following data for said lenses 1 to 9:

| Notation | Surface | Radius [mm] | Thickness [mm] | $n_d$ | $v_d$ |
|---|---|---|---|---|---|
| Lens 1 | 1 | 215.573 | 7.400 | 1.8052 | 25.4 |
|  | 2 | 60.054 | 19.873 |  |  |
| Lens 2 | 3 | −86.116 | 6.198 | 1.7292 | 54.5 |
|  | 4 | 214.588 | 5.812 |  |  |
| Lens 3 | 5 | −159.767 | 25.000 | 1.7174 | 29.5 |
|  | 6 | −97.046 | 1.422 |  |  |
| Lens 4 | 7 | 233.759 | 19.000 | 1.7292 | 54.5 |
|  | 8 | −110.662 | 133.385 |  |  |
| Stop | 9 | planar | 34.694 |  |  |
| Lens 5 | 10 | 119.584 | 11.300 | 1.8061 | 40.6 |
|  | 11 | 52.245 | 3.364 |  |  |
| Lens 6 | 12 | 192.641 | 7.500 | 1.5168 | 64.2 |
|  | 13 | −65.831 | 12.288 |  |  |
| Lens 7 | 14 | −37.013 | 5.000 | 1.5827 | 46.6 |
| Lens 8 | 15 | 293.564 | 15.600 | 1.4970 | 81.6 |
|  | 16 | −48.182 | 0.200 |  |  |
| Lens 9 | 17 | 181.597 | 15.000 | 1.4970 | 81.6 |
|  | 18 | −65.785 |  |  |  |

Focal length: 57 mm
Relative aperture: 1:2.5
Image angle: 2w = 35.1°.

12. A projection objective as set forth in claim 10, having the following data for said lenses 1 to 9:

| Notation | Surface | Radius [mm] | Thickness [mm] | $n_d$ | $v_d$ |
|---|---|---|---|---|---|
| Lens 1 | 1 | 489.067 | 7.500 | 1.7440 | 44.9 |
|  | 2 | 76.083 | 17.565 |  |  |
| Lens 2 | 3 | −65.740 | 7.500 | 1.7552 | 27.6 |
|  | 4 | 166.123 | 4.232 |  |  |
| Lens 3 | 5 | −1167.668 | 24.000 | 1.7552 | 27.6 |
|  | 6 | −95.446 | 0.992 |  |  |
| Lens 4 | 7 | 191.825 | 23.000 | 1.6584 | 50.9 |
|  | 8 | −101.162 | 132.991 |  |  |
| Stop | 9 | planar | 19.359 |  |  |
| Lens 5 | 10 | −79.551 | 24.881 | 1.6727 | 32.3 |
|  | 11 | 92.129 | 7.145 |  |  |
| Lens 6 | 12 | 107.711 | 13.349 | 1.6584 | 50.9 |
|  | 13 | −108.508 | 25.694 |  |  |
| Lens 7 | 14 | 448.856 | 6.000 | 1.6204 | 60.3 |
| Lens 8 | 15 | 56.510 | 17.000 | 1.4970 | 81.6 |
|  | 16 | −133.601 | 0.200 |  |  |
| Lens 9 | 17 | 107.738 | 9.199 | 1.4970 | 81.6 |
|  | 18 | −409.370 |  |  |  |

Focal length: 69 mm
Relative aperture: 1:2.5
Image angle: 2w = 29.2°.

13. A projection objective having a fixed focal length for digital projection including an arrangement of lenses, comprising in sequence from enlargement side to reduction side:
   a first, negative lens;
   a second, negative lens;
   a third lens;
   a fourth, positive lens;
   a fifth lens;
   a sixth, positive lens;
   a seventh, negative lens;
   an eighth, positive lens; and
   a ninth, positive lens, wherein the lenses have the following relationships for the values of index of refraction $n_d$ and abbe number $v_d$:

| Lens No. | $n_d$ | $v_d$ |
|---|---|---|
| 1 | Greater than 1.6 | Less than 62 |
| 2 | Between 1.58 and 1.8 | Less than 62 |
| 3 | Greater than 1.65 | Less than 41 |
| 4 | Between 1.6 and 1.8 | Between 45 and 62 |
| 5 | Greater than 1.64 | Between 30 and 45 |
| 6 | Less than 1.74 | Greater than 44 |
| 7 | Less than 1.75 | Between 40 and 66 |
| 8 | Less than 1.50 | Greater than 70 |
| 9 | Less than 1.50 | Greater than 70. |

14. A projection objective having a fixed focal length for digital projection including an arrangement of lenses, comprising in sequence from the enlargement side to reduction side:
   a first, negative lens;
   a second, negative lens;
   a third lens;
   a fourth, positive lens;
   a fifth lens;
   a sixth, positive lens;
   a seventh, negative lens;
   an eighth, positive lens; and
   a ninth, positive lens, wherein the lenses have the following relationships for the values of index of refraction $n_d$ and abbe number $v_d$:

| Lens No. | $n_d$ | $v_d$ |
|---|---|---|
| 1 | Greater than 1.7 | Less than 50 |
| 2 | Between 1.56 and 1.8 | Less than 62 |
| 3 | Greater than 1.65 | Less than 35 |
| 4 | Between 1.6 and 1.8 | Between 45 and 60 |
| 5 | Greater than 1.65 | Between 30 and 45 |
| 6 | Less than 1.7 | Greater than 45 |
| 7 | Less than 1.75 | Between 40 and 61 |
| 8 | Less than 1.50 | Greater than 70 |
| 9 | Less than 1.50 | Greater than 70. |

15. A projection objective having a fixed focal length for digital projection including an arrangement of lenses, comprising in sequence from the enlargement side to reduction side:
   a first, negative lens;
   a second, negative lens;
   a third lens;
   a fourth, positive lens;
   a fifth lens;
   a sixth, positive lens;
   a seventh, negative lens;
   an eighth, positive lens; and
   a ninth, positive lens, wherein the optical correction and the back focal length of said projection objective permit a beam splitter between the objective and the object to be projected, which beam splitter has a glass path from 80 mm to 130 mm.

16. A projection objective having a fixed focal length for digital projection including an arrangement of lenses, comprising in sequence from enlargement side to reduction side:
   a first, negative lens;
   a second, negative lens;
   a third lens;

a fourth, positive lens;
a fifth lens;
a sixth, positive lens;
a seventh, negative lens;
an eighth, positive lens; and
a ninth, positive lens, the projection objective including a reduction side pupil disposed at least 800 mm away from the objective.

17. A projection objective having a fixed focal length for digital projection including an arrangement of lenses, comprising in sequence from enlargement side to reduction side:
a first, negative lens;
a second, negative lens;
a third lens;
a fourth, positive lens;
a fifth lens;
a sixth, positive lens;
a seventh, negative lens;
an eighth, positive lens; and
a ninth, positive lens, wherein each of said lens surfaces is spherical or planar.

18. A projection objective having a fixed focal length for digital projection including an arrangement of lenses, comprising in sequence from enlargement side to reduction side:
a first, negative lens;
a second, negative lens;
a third lens;
a fourth, positive lens;
a fifth lens;
a sixth, positive lens;
a seventh, negative lens;
an eighth, positive lens; and
a ninth, positive lens, the projection objective having the following data for said lenses 1 to 9:

| Notation | Surface | Radius [mm] | Thickness [mm] | $n_d$ | $v_d$ |
|---|---|---|---|---|---|
| Lens 1 | 1 | 215.573 | 7.400 | 1.8052 | 25.4 |
|  | 2 | 60.054 | 19.873 |  |  |
| Lens 2 | 3 | −86.116 | 6.198 | 1.7292 | 54.5 |
|  | 4 | 214.588 | 5.812 |  |  |
| Lens 3 | 5 | −159.767 | 25.000 | 1.7174 | 29.5 |
|  | 6 | −97.046 | 1.422 |  |  |
| Lens 4 | 7 | 233.759 | 19.000 | 1.7292 | 54.5 |
|  | 8 | −110.662 | 133.385 |  |  |
| Stop | 9 | planar | 34.694 |  |  |
| Lens 5 | 10 | 119.584 | 11.300 | 1.8061 | 40.6 |
|  | 11 | 52.245 | 3.364 |  |  |
| Lens 6 | 12 | 192.641 | 7.500 | 1.5168 | 64.2 |
|  | 13 | −65.831 | 12.288 |  |  |
| Lens 7 | 14 | −37.013 | 5.000 | 1.5827 | 46.6 |
| Lens 8 | 15 | 293.564 | 15.600 | 1.4970 | 81.6 |
|  | 16 | −48.182 | 0.200 |  |  |
| Lens 9 | 17 | 181.597 | 15.000 | 1.4970 | 81.6 |
|  | 18 | −65.785 |  |  |  |

Focal length: 57 mm
Relative aperture: 1:2.5
Image angle: 2w = 35.1°.

19. A projection objective having a fixed focal length for digital projection including an arrangement of lenses, comprising in sequence from enlargement side to reduction side:
a first, negative lens;
a second, negative lens;
a third lens;
a fourth, positive lens;
a fifth lens;
a sixth, positive lens;
a seventh, negative lens;
an eighth, positive lens; and
a ninth, positive lens, having the following data for said lenses 1 to 9:

| Notation | Surface | Radius [mm] | Thickness [mm] | $n_d$ | $v_d$ |
|---|---|---|---|---|---|
| Lens 1 | 1 | 489.067 | 7.500 | 1.7440 | 44.9 |
|  | 2 | 76.083 | 17.565 |  |  |
| Lens 2 | 3 | −65.740 | 7.500 | 1.7552 | 27.6 |
|  | 4 | 166.123 | 4.232 |  |  |
| Lens 3 | 5 | −1167.668 | 24.000 | 1.7552 | 27.6 |
|  | 6 | −95.446 | 0.992 |  |  |
| Lens 4 | 7 | 191.825 | 23.000 | 1.6584 | 50.9 |
|  | 8 | −101.162 | 132.991 |  |  |
| Stop | 9 | planar | 19.359 |  |  |
| Lens 5 | 10 | −79.551 | 24.881 | 1.6727 | 32.3 |
|  | 11 | 92.129 | 7.145 |  |  |
| Lens 6 | 12 | 107.711 | 13.349 | 1.6584 | 50.9 |
|  | 13 | −108.508 | 25.694 |  |  |
| Lens 7 | 14 | 448.856 | 6.000 | 1.6204 | 60.3 |
| Lens 8 | 15 | 56.510 | 17.000 | 1.4970 | 81.6 |
|  | 16 | −133.601 | 0.200 |  |  |
| Lens 9 | 17 | 107.738 | 9.199 | 1.4970 | 81.6 |
|  | 18 | −409.370 |  |  |  |

Focal length: 69 mm
Relative aperture: 1:2.5
Image angle: 2w = 29.2°.

* * * * *